(12) United States Patent
Piccinelli et al.

(10) Patent No.: US 6,556,718 B1
(45) Date of Patent: Apr. 29, 2003

(54) VIDEO PICTURES COMPRESSION AND CODING WITH DECISION STEP FOR FIELD/FRAME AND MOTION VECTORS DCT

(75) Inventors: Emiliano Piccinelli, Monza (IT); Luca Pezzoni, Cormano (IT); Danilo Pau, Sesto San Giovanni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/438,853

(22) Filed: Nov. 12, 1999

(30) Foreign Application Priority Data

Nov. 17, 1998 (EP) .............................. 98830689

(51) Int. Cl.⁷ .............................. G06K 9/36; G06K 9/46
(52) U.S. Cl. .................................. 382/236; 375/240.13
(58) Field of Search .............................. 382/232, 236, 382/238, 239, 250; 375/240.02, 240.12, 240.13, 240.16, 240.2, 240.24; 348/394.1, 395.1, 403.1, 404.1, 407.1, 409.1, 415.1, 416.1, 420.1

(56) References Cited

U.S. PATENT DOCUMENTS 5,666,461 A    9/1997  Igarashi et al. ............... 386/95
5,883,672 A *  3/1999  Suzuki et al. .......... 375/240.04
5,978,029 A * 11/1999  Boice et al. ........... 375/240.14

FOREIGN PATENT DOCUMENTS

EP      0 695 097 A2    1/1996    ............ H04N/7/50

* cited by examiner

Primary Examiner—Timothy M. Johnson
(74) Attorney, Agent, or Firm—Allen, Dyer, Doppelt, Milbrath & Gilchrist, P.A.; Lisa K. Jorgenson

(57) ABSTRACT

A method for coding video data according to the MPEG-2 standard is provided. Non-Intra fields are identified among Intra fields and various coding options exist for the non-Intra fields, including removal of temporal redundancy using a motion estimation algorithm and identification of predictor macroblocks for providing approximation according to a prediction mode selectable among respective predicting modes of the different types of non-Intra fields. The method includes calculating a discrete cosine transform (DCT) for blocks of data of the predictor macroblocks according to a frame mode of decomposition with the blocks being composed of lines of data belonging to even lines semifield and to odd lines semifield, or in a field mode of decomposition with the blocks being composed of lines of data belonging to the same semifield. The data resulting from the DCT carried out by blocks of data to be stored is quantized and coded. The efficiency of the method for coding video data according to the MPEG-2-standard is increased by selecting between field or frame modes and motion compensation or no motion compensation with an algorithm that assesses and compares significant complexity indexes of the macroblocks.

13 Claims, 9 Drawing Sheets

VIDEO PICTURES COMPRESSION AND CODING WITH DECISION STEP FOR FIELD/FRAME AND MOTION VECTORS DCT

FIELD OF THE INVENTION

The invention relates to video picture compression techniques, and, more particularly, to an algorithm for optimizing performance of a motion estimation system and for optimizing a discrete cosine transform (DCT) of the video data in compression and coding phases.

BACKGROUND OF THE INVENTION

The set of pixels of a field of a picture may be placed in a position of a subsequent picture obtained by translating the preceding one. These transpositions of objects may expose to the video camera parts that were not visible before as well as changes of their contours, such as during zooming, for example. The family of algorithms suitable to identify and associate these portions of images is generally referred to as motion estimation. Such an association permits calculation of the portion of a difference image by removing the redundant temporal information. This makes the subsequent process of compression by discrete cosine transform, quantization and entropy coding more effective.

A typical example of such a method is found in the MPEG-2 standard. In consideration of the importance of such a widely adapted standard, and by way of example, reference will be made in the following description to the MPEG-2 standard for making the illustration easier to follow. The considerations that will be made remain valid for other standards and for motion estimation systems.

A typical block diagram of a video MPEG-2 coder is depicted in FIG. 1. Such a system is made up of the following functional blocks:

Field ordinator. This block is composed of one or several field memories outputting the fields in the coding order required by the MPEG standard. For example, if the input sequence is I B B P B B P etc., the output order will be I P B B P B B . . .

I (Intra coded picture) is a field and/or a semifield containing temporal redundancy;

P (Predicted-picture) is a field and/or semifield from which the temporal redundancy with respect to the preceding I or P (previously codecoded) has been removed;

B (Bidirectionally predicted-picture) is a field and/or a semifield whose temporal redundancy with respect to the proceeding I and subsequent P (or preceding P and successive P) has been removed. In both cases the I and P pictures must be considered as already co/decoded.

Each frame buffer in the format 4:2:0 occupies the following memory space:

| standard PAL | |
|---|---:|
| 720 × 576 × 8 for the luminance (Y) = | 3,317,760 bits |
| 360 × 288 × 8 for the chrominance (U) = | 829,440 bits |
| 360 × 288 × 8 for the chrominance (V) = | 829,440 bits |
| total Y + U + V = | 4,976,640 bits |
| standard NTSC | |
| 720 × 480 × 8 for the luminance (Y) = | 2,764,800 bits |
| 360 × 240 × 8 for the chrominance (U) = | 691,200 bits |
| 360 × 240 × 8 for the chrominance (V) = | 691,200 bits |
| Total Y + U + V = | 4,147,200 bits |

Motion Estimator. This block removes the temporal redundancy from the P and B pictures. This functional block operates only on the most energetic components of the sequence to be coded, i.e., the richest of picture information, such as the luminance component.

DCT. This block implements the discrete cosine transform (DCT) according to the MPEG-2 standard. The I picture and the error pictures P and B are divided in 8*8 blocks of pixels Y, U, V onto which the DCT is performed.

Quantizer Q. An 8*8 block resulting from the DCT is then divided by a quantizing matrix to reduce the magnitude of the DCT coefficients. In such a case, the information associated to the highest frequencies less visible to human sight tends to be removed. The result is reordered and sent to the successive block.

Variable Length Coding (VLC). The codification words output from the quantizer tend to contain a large number of null coefficients, followed by non-null values. The null values preceding the first non-null value are counted and the count figure constitutes the first portion of a codification word, the second portion of which represents the non-null coefficient.

These paired values tend to assume values more probable than others. The most probable ones are coded with relatively short words, e.g., composed of 2, 3 or 4 bits, while the least probable are coded with longer words. Statistically, the number of output bits is less than in the case such methods are not implemented.

Multiplexer and Buffer. Data generated by the variable length coder, the quantizing matrices, the motion vectors and other syntactic elements are assembled for constructing the final syntax contemplated by the MPEG-2 standard. The resulting bitstream is stored in a memory buffer. The size limit of the memory buffer is defined by the MPEG-2 standard, and cannot be overfilled. The quantizer block Q supports this limit by adjusting the division of the DCT 8*8 blocks. This division is based on the space available in the memory buffer, and on the energy of the 8*8 source block taken upstream of the motion estimation and the DCT process.

Inverse Variable Length Coding (I-VLC). The variable length coding functions specified above are executed in an inverse order.

Inverse Quantization (IQ). The words output by the I-VLC block are reordered in the 8*8 block structure, which is multiplied by the same quantizing matrix that was used for its preceding coding.

Inverse DCT (I-DCT). The DCT function is inverted and applied to the 8*8 block output by the inverse quantization process. This permits passing from the domain of spatial frequencies to the pixel domain.

Motion Compensation and Storage. Two pictures may alternatively be present at the output of the I-DCT block. First alternative is a decoded I picture or semipicture that must be stored in a respective memory buffer for removing the temporal redundancy from subsequent P and B pictures. A second alternative is a decoded prediction error picture (semipicture) P or B that must be summed to the information removed previously during the motion estimation phase. In case of a P picture, such a resulting sum stored in a dedicated memory buffer is used during the motion estimation process for the successive P pictures and B pictures. These field memories are generally distinct from the field memories that are used for re-arranging the blocks.

Display Unit. This unit converts the pictures from the format 4:2:0 to the format 4:2:2 and generates the interlaced format for displaying the images. The most energetic and therefore richer of information component, such as the luminance, is represented as a matrix of N lines and M columns. Each field is divided in portions called macroblocks, with each portion having R lines and S columns. The results of the divisions N/R and M/S must be two integer numbers, but not necessarily equal to each other.

Upon referring to FIG. 2a, two subsystems which include the estimator block shown in FIG. 1 are the following:

a) Motion estimator. This first subblock searches the predictors of each macroblock according to a certain estimation algorithm and decides, among the different predicting options described by the standard, the one that yields the best results. It supplies the successive block and the final buffer with the motion vectors and the type of prediction selected.

The prediction forms for the different types of fields are as follows. For the Intra fields, the prediction forms include Intra, P fields, Forward field, Frame field and Dual prime. For the B fields, the prediction forms include Field Forward, Field Backward, Filed Interpolated, Frame Forward, Frame Backward and Frame Interpolated b) Decider. This sub-block is the part of the estimator that selects the coding mode of the single macroblocks, as well as the transform mode in the domain of the frequencies of the prediction errors relative to each one of them. The coding mode for the Intra fields are Intra. The different coding modes for the P fields are Intra, Forward Predictive and No motion compensated. The different coding modes for the B fields are Intra, Forward Predictive, Backward Predictive and Interpolated Predictive.

However, as far as the DCT block is concerned (FIG. 1), this decomposes the different macroblocks in smaller parts of 8*8 pixels. Nevertheless, the decomposition of the macroblocks in blocks may be carried out in two different modes: field or frame.

From FIG. 2b, and assuming macroblocks of 16*16 pixels wherein the rows belonging to two successive semifields compose the same picture, it is possible to divide the macroblock into 4 blocks. The discrete cosine transform may be applied onto the blocks in two different modes. One mode is the frame mode, wherein the four macroblocks include rows belonging to both semifields. A second mode is the field mode, wherein the four blocks include rows belonging to the same semifield.

However, according to the MPEG-2 video standard, there exist three possible coding modes for the fields present in each sequence: Intra (or I), P or B, as already mentioned above. In the case of Intra fields, each macroblock will be coded according to the Intra mode. For the case of non-Intra fields, it is possible to independently code each macroblock as described below.

If the current field is a P field, then the admitted coding modes are: Intra, No motion compensation and Motion compensation. In case of B pictures, the admitted coding modes are: Intra, Forward Predictive, Backward Predictive and Interpolated. Therefore, for Intra fields it is necessary to only decide how to apply the DCT to the different blocks in a field or frame mode. For non-Intra fields P and B, it is also necessary to establish how to predict the single macroblock being considered.

The decision algorithm (TM5). According to the known technique, as far as the decision on the type of DCT to be used is concerned, the procedure is the same for all types of fields and macroblocks. This procedure, as better illustrated in the ensuing description, is based on estimations of variance and correlation among samples of the detected predicted error. As far as the decision on the type of prediction is concerned, the procedure is based on variance estimates, wherein the selection of the prediction mode considers the variance estimates.

Selection of the prediction method. First, the algorithm calculates for a chosen type of prediction the mean square error:

$$MSE = \sum_{j=0}^{15} \sum_{i=0}^{15} (\varepsilon_{i,j})^2$$

For $\varepsilon_{i,j} = p^*_{i,j} - p_{i,j}$, the variable $p^*$ indicates the pixels that compose the predictor, and $p$ indicates the pixels that compose the current macroblock at the position (i,j). The current macroblock being processed will be coded without motion estimation or Intra if:

$$\begin{cases} MSE > VAR \\ MSE \geq 9 \cdot 256 \end{cases}$$

MSE is the mean square error, whereas VAR is the sampling variance of the reference macroblock, that is:

$$var = \sum_{j=0}^{15} \sum_{i=0}^{15} p_{i,j}^2 - \frac{\left(\sum_{j=0}^{15} \sum_{i=0}^{15} p_{i,j}\right)^2}{256}$$

The variable $P_{i,j}$ is the value of the pixel of the current macroblock. This means that * for the current macroblock to be coded as Intra, the predicting mean square error must be greater than the variance of the pixels that compose such a macroblock and also greater than a trial and error placed threshold. In such a case, it is no longer convenient to code the macroblock in the form of the predicting error because the entropy associated to it would be greater than the one associated to the single pixels that compose it, thus degrading the compression efficiency. For the current macroblock to be coded as non-Intra, it is sufficient that at least one of the two above mentioned conditions be unverified.

To code the current macroblock as Intra, the coder will not consider the values of its single pixels directly as samples that will be thereafter transformed and quantized, but will perform these operations on samples obtained from the pixels. This is done by subtracting from them the value 128 that is at the middle of the variability field. In contrast, should a non-Intra coding be decided, it is possible to discriminate among two different cases depending on whether the current picture from which originates the reference macroblock is either a B or a P picture.

In the first case, the system simply updates the structure predisposed to contain the motion vectors with the selected values. In the second case, instead, the coder may decide to code the macroblock with or without motion compensation (MC/no-MC). To do this, it calculates the mean square error between the reference macroblock and the one placed on the field on which the prediction is based with the same absolute coordinates of the first referred to as $V_0$. A comparison is made with the previously found mean square error (MSE). The coder will decide to use the motion estimation result if, and only if, the following two conditions are simultaneously verified:

$$\begin{cases} V_0 > \frac{5}{4} \cdot MSE \\ V_0 \geq 9 \cdot 256 \end{cases}$$

FIG. 2c illustrates the scheme of the decision algorithm according to the known technique.

DCT field or frame. First, the procedure contemplates the calculation of the product of the variance estimates of the prediction errors of the two fields separately:

$$d = \left[\sum_{j=0}^{7}\sum_{i=0}^{15}\varepsilon_{Top(i,j)}^2 - \frac{\left(\sum_{j=0}^{7}\sum_{i=0}^{15}\varepsilon_{Top(i,j)}\right)^2}{128}\right] \cdot \left[\sum_{j=0}^{7}\sum_{i=0}^{15}\varepsilon_{Bot(i,j)}^2 - \frac{\left(\sum_{j=0}^{7}\sum_{i=0}^{15}\varepsilon_{Bot(i,j)}\right)^2}{128}\right]$$

The variable $\varepsilon_{Top}$ is the prediction error of the Top field composed of the even lines of the field: 0, 2, 4, . . . The variable $\varepsilon_{Bot}$ is the predicting error of the Bottom field composed of the odd lines of the field: 1, 3, 5, . . .

In the case of Intra fields, the prediction error is calculated with respect to a hypothetical block whose pixels have all the same value equal to 128, which is at the center of the variability range of the pixel values 0–255. Should d be a null, the prediction error associated to at least one of the two fields is uniform, and thus it is convenient to compute a DCT field only one coefficient after DC1. At least one of the two fields has a null variance so the two fields are uncorrelated and the DCT is then computed in a Field mode. The Field mode is independent of the two semifields that make up the Y, U and V blocks. In contrast, if d is positive, then the correlation index should be calculated among the prediction errors on two fields:

$$\rho = \left[\left[\sum_{j=0}^{7}\sum_{i=0}^{15}(\varepsilon_{Top}[i,j]\cdot\varepsilon_{Bot}[i,j])\right] - \left(\sum_{i=0}^{15}\sum_{i=0}^{15}\varepsilon_{Top}[i,j]\cdot\sum_{j=0}^{15}\sum_{i=0}^{15}\varepsilon_{Bot}[i,j]\right)\middle/128\right]\middle/\sqrt{d}$$

When such an index is high, i.e., greater than a predefined threshold, the DCT is calculated in a Frame mode. In contrast, if such an index is small, i.e., less than the predefined threshold, the prediction error among the two fields is uncorrelated. Therefor, the DCT is calculated in a Field mode.

From the above and according to the known technique, the selection of the prediction method and the discrete cosine transformation mode (field or frame) are both carried out through an algorithm which requires a significantly complex processing. This processing requires the calculation of variance and correlation indexes through the execution of multiplication, square root, division operations etc. For these reasons, a hardware implementation of the algorithm is rather burdensome and costly.

SUMMARY OF THE INVENTION

An object of the present invention is to provide a method for coding video data using a simpler hardware implementation than the known method. In particular, the object is to provide an algorithm for selection of the prediction method and the DCT mode that is simpler than the algorithm of the prior art and less burdensome to be implemented in hardware.

This object is achieved with the method of the present invention using operations that need to be performed via multiplications by powers of 2. This may be implementable without any appreciable additional hardware cost. The method of the invention is not based on the calculation of variance and correlation indexes, but rather on the evaluation of differences between adjacent pixels for identifying a complexity index, and for processing spread indexes of mean absolute prediction errors.

The architecture of this present invention may be advantageously used and is applicable to systems processing digitized pictures according to the MPEG-2 protocol, and also to protocols different from the MPEG-2 standard.

DETAILED DESCRIPTION OF THE PREFERRED EMBODIMENTS

The novel algorithm of the present invention for choosing among the distinct options is described below.

Selection of the prediction method. First, it is necessary to define the mean absolute spread computed with respect to the mean in the following manner, indicating with $p_{i,j}$ the value of a pixel of the macroblock:

$$SMA_p \equiv E[|p_{i,j} - \mu|] = \sum_{j=0}^{15} \sum_{i=0}^{15} |p_{i,j} - \mu|$$

$$\mu = \frac{\sum_{j=0}^{15} \sum_{i=0}^{15} p_{i,j}}{256}$$

This value $SMA_p$ is calculated with respect to the macroblock being estimated, whose prediction is being sought. The E operator indicates an average operation, and m indicates the average value of the pixels. By indicating with $e_{ij}$ the prediction error for a specific pixel ($e_{i,j}=p_{i,j}-p^*_{i,j}$) and with $\mu_\epsilon$ the mean value of such errors, the absolute mean spread of the prediction errors with respect to their average value is given by:

$$SMA_\varepsilon = E[|\varepsilon_{i,j} - \mu_\varepsilon|] = \sum_{j=0}^{15} \sum_{i=0}^{15} |\varepsilon_{i,j} - \mu_\varepsilon|$$

$$\mu_\varepsilon = \frac{\sum_{j=0}^{15} \sum_{i=0}^{15} \varepsilon_{i,j}}{256}$$

The index SMA is used to select between Intra and non-Intra coding. A macroblock will be coded as Intra if the following conditions are simultaneously met:

$$\begin{cases} SMA_\varepsilon > SMA_p \\ SMA_\varepsilon \geq Threshold1 \end{cases}$$

If the field to which the macroblock belongs is a B field, and both the above conditions are not complied with, no further control is performed. The obtained predictor will be inserted in the bit stream together with the motion vectors that characterize it. The motion vectors are the prediction method Forward, Backward or Interpolated, and the quantized prediction error.

The same criteria is used also for the macroblocks belonging to a P field. However, after choosing between an Intra or non-Intra coding, it is necessary to perform a further discrimination to choose whether to use the motion compensation MC mode or No-MC mode. A decision will be made on whether to use and, thereby, insert the motion vector together with the prediction error and the prediction mode selected in the bit-stream if the following conditions are satisfied:

$$\begin{cases} SMA_{\varepsilon 0} > SMA_\varepsilon \\ SMA_{\varepsilon 0} \geq Threshold2 \end{cases}$$

$SMA_{\varepsilon 0}$ is the absolute mean spread calculated with respect to the macroblock identified by the null vector. In contrast, if motion compensation is not chosen, a null motion vector will be inserted in place of the one found.

Figure 3:
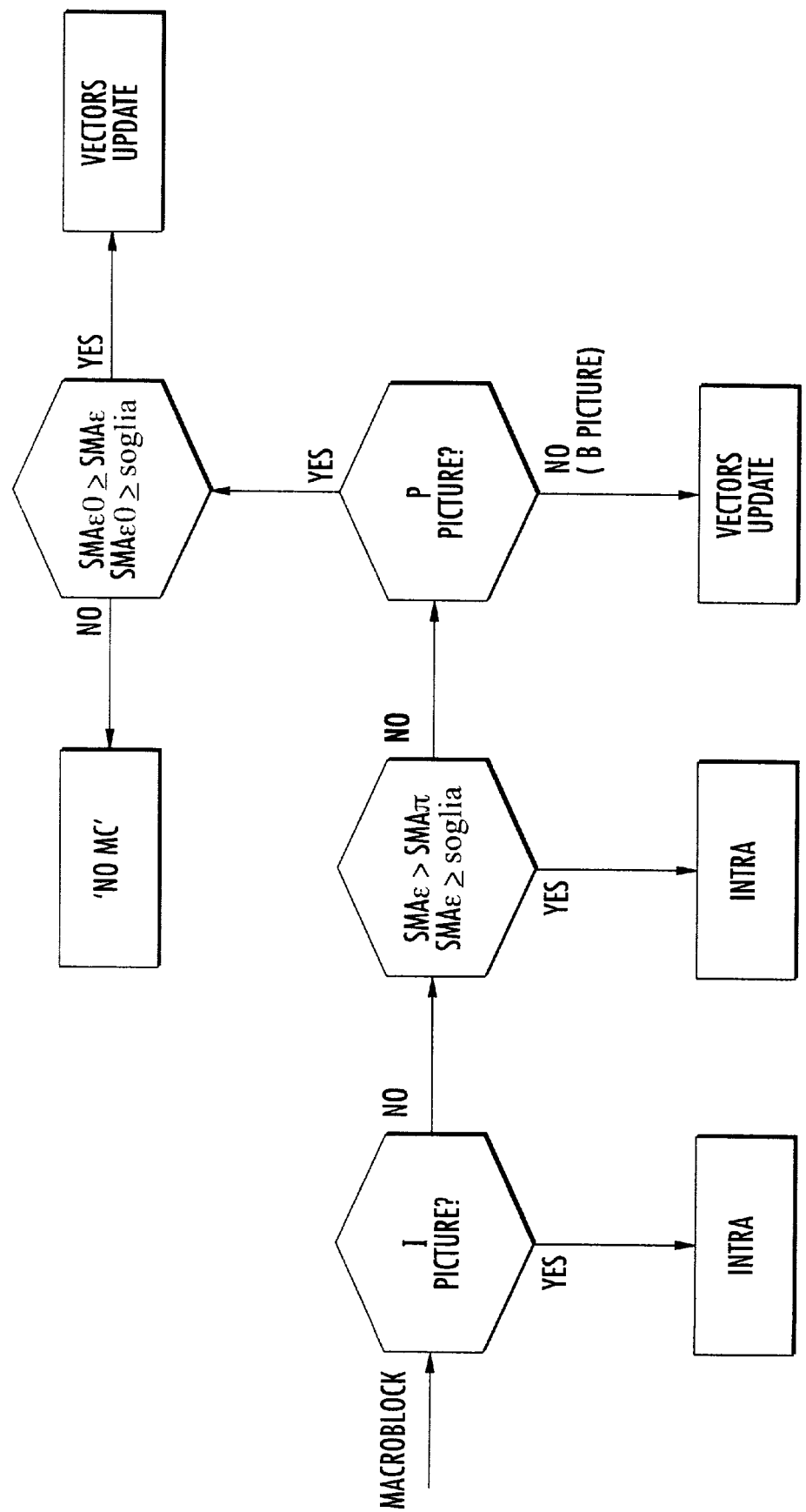
FIG. 3 is a functional block diagram of the decision steps for selection of the Intra/non-Intra and motion compensation/no-motion compensation options in accordance with the present invention
Figure 4:
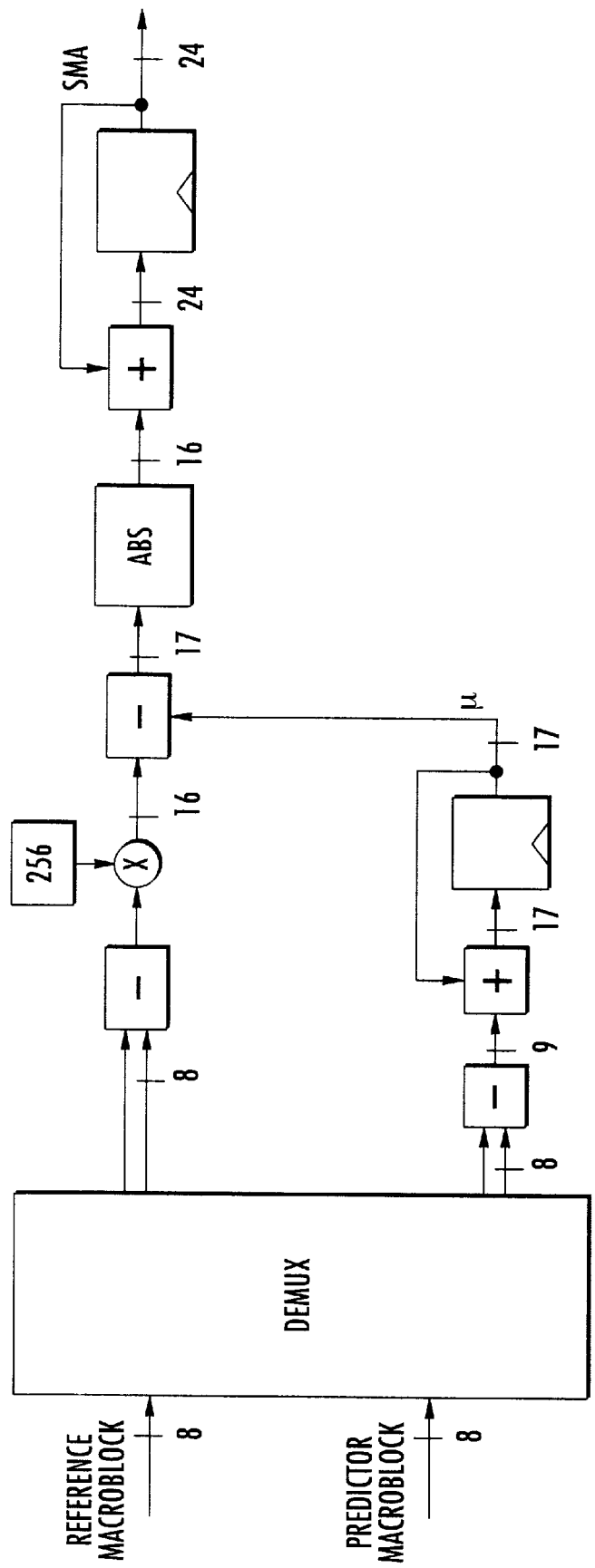
FIG. 4 is a functional block diagram of the Calculation block for the mean absolute spread relative to the mean value upon which the Intra/non-Intra selection is based in accordance with the present invention.

FIG. 3 shows a flow chart of the above described method and FIG. 4 shows an embodiment of the hardware architecture for calculating the absolute mean spread, both in accordance with the present invention.

Figure 5:
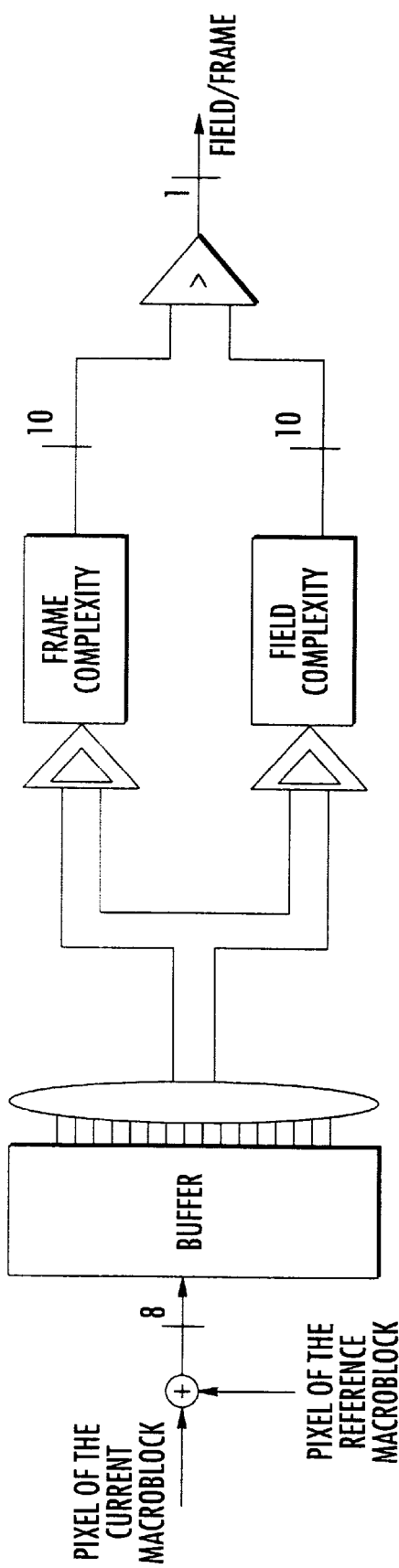
FIG. 5 is a block diagram of the selection method relative to the field-DCT/frame-DCT for each macroblock of a field in accordance with the present invention.
Figure 6:
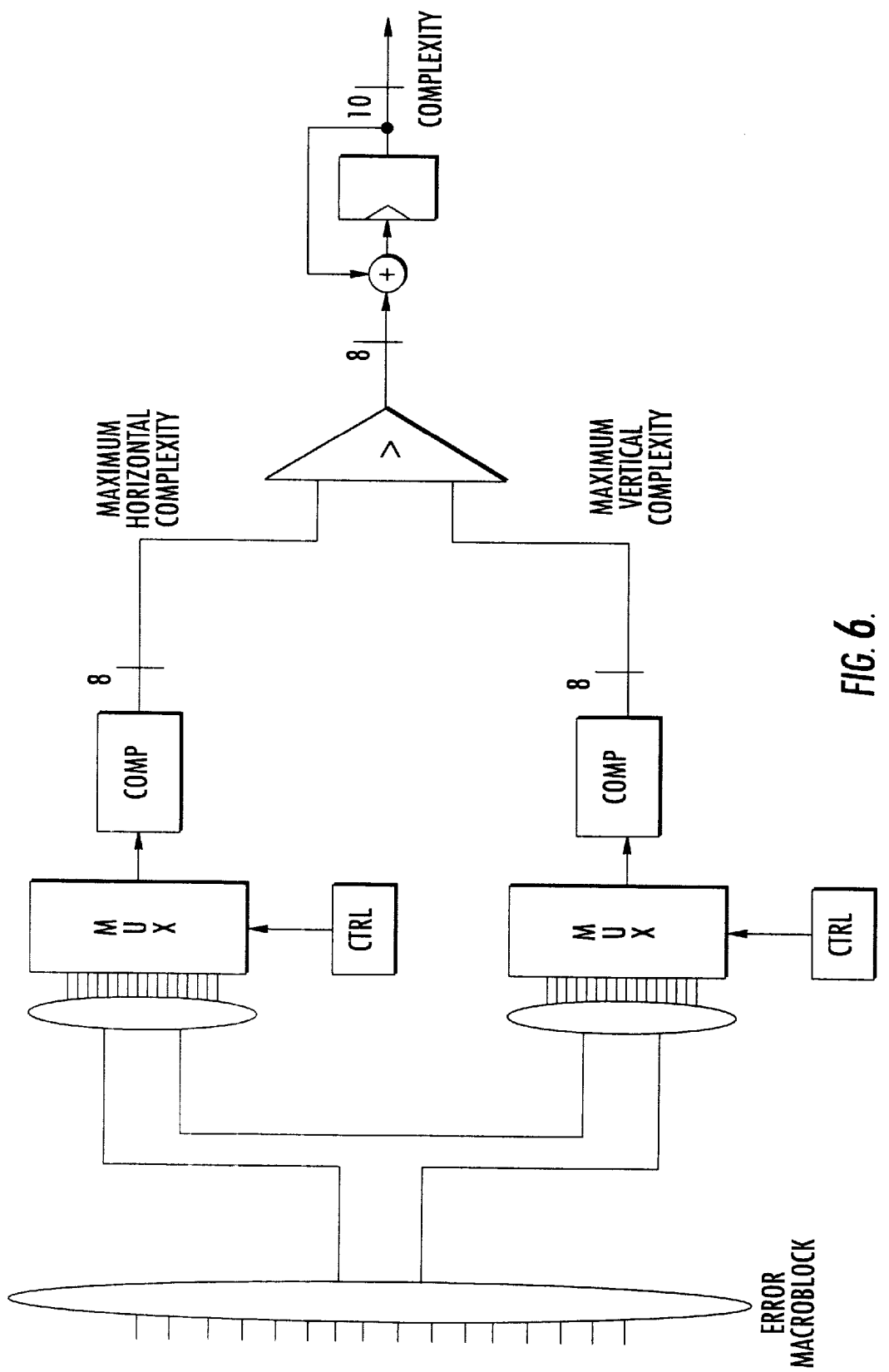
FIG. 6 is a more detailed block diagram of the Field Complexity block and Frame Complexity block in FIG. 5 for calculating the total complexity of the macroblock.
Figure 7:
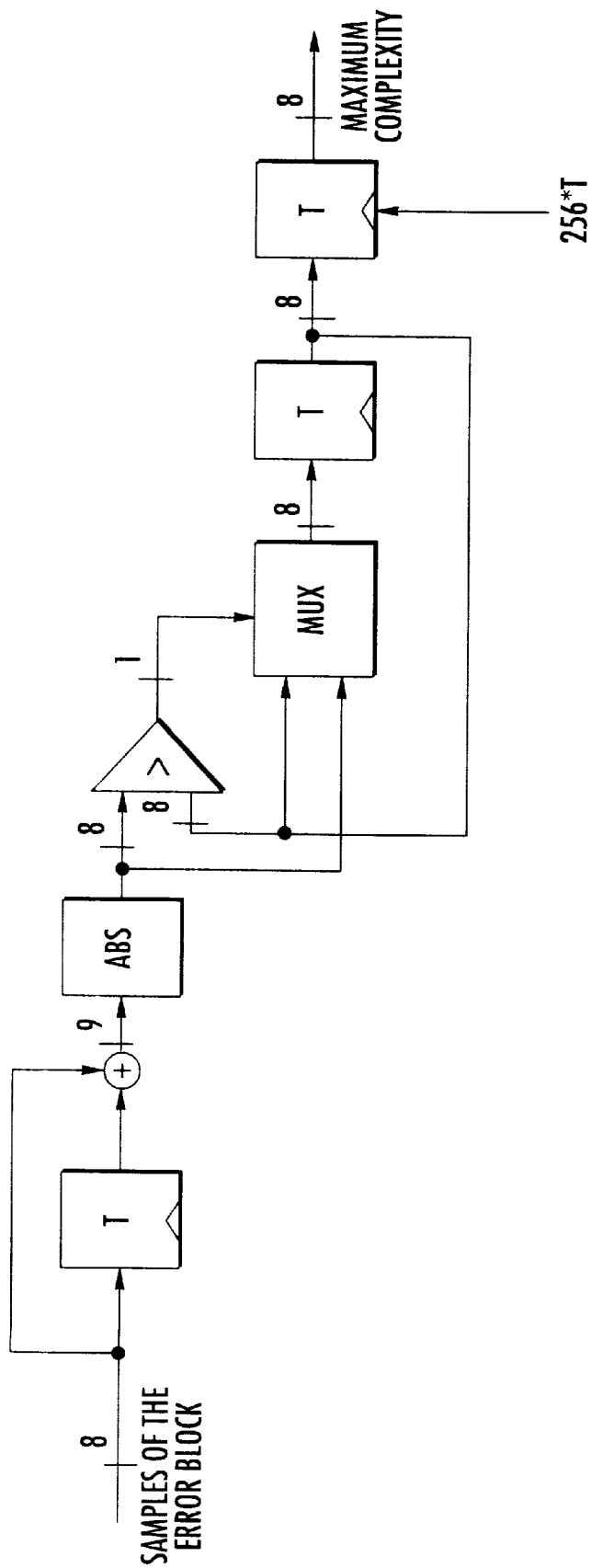
FIG. 7 is a more detailed block diagram of the COMP block in FIG. 6 for calculating the complexity of a block in a horizontal or vertical direction.
Figure 1:
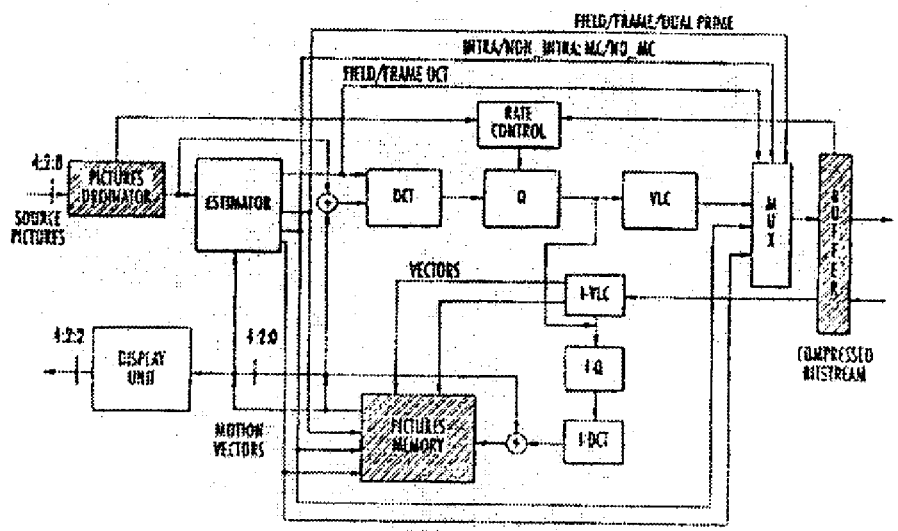
Figure 2A:
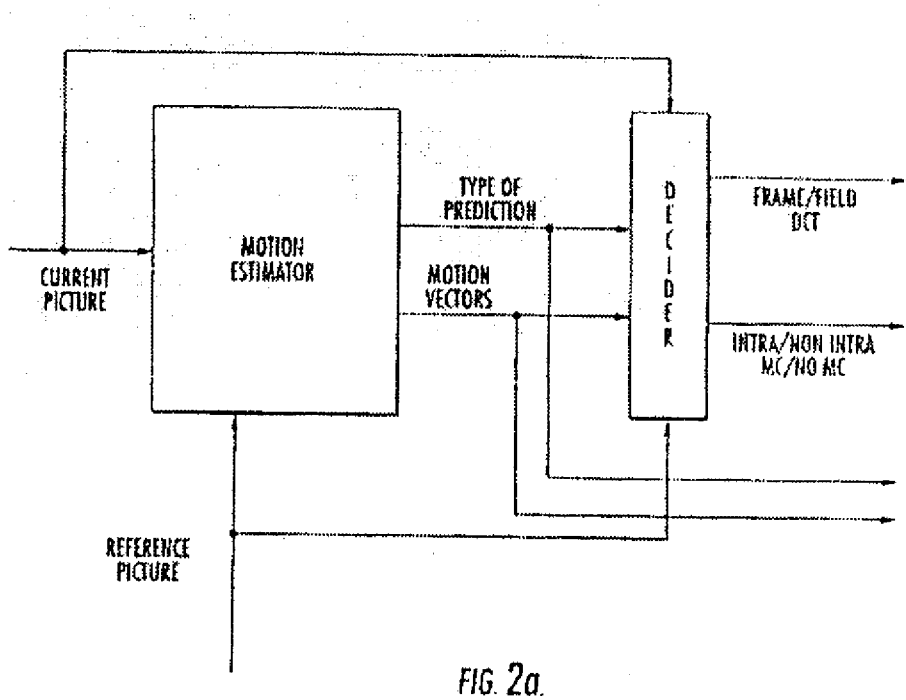
Figure 1:
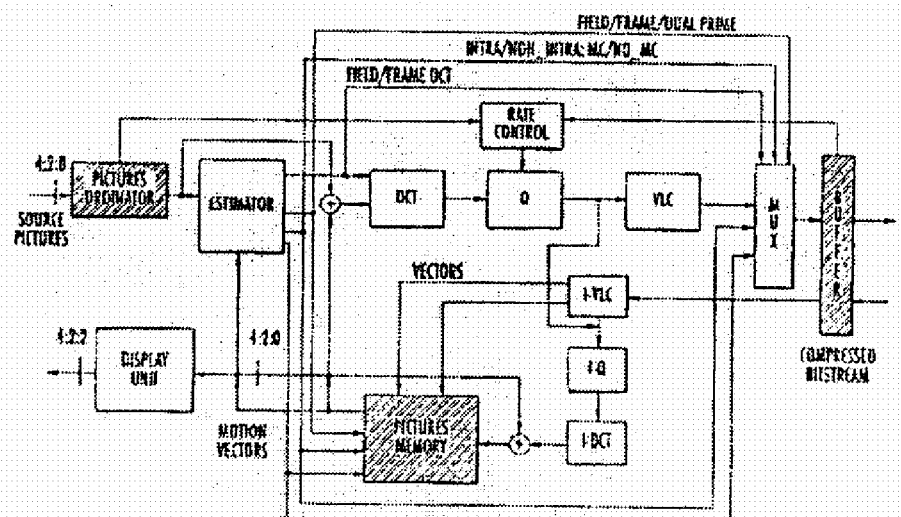
Figure 2A:
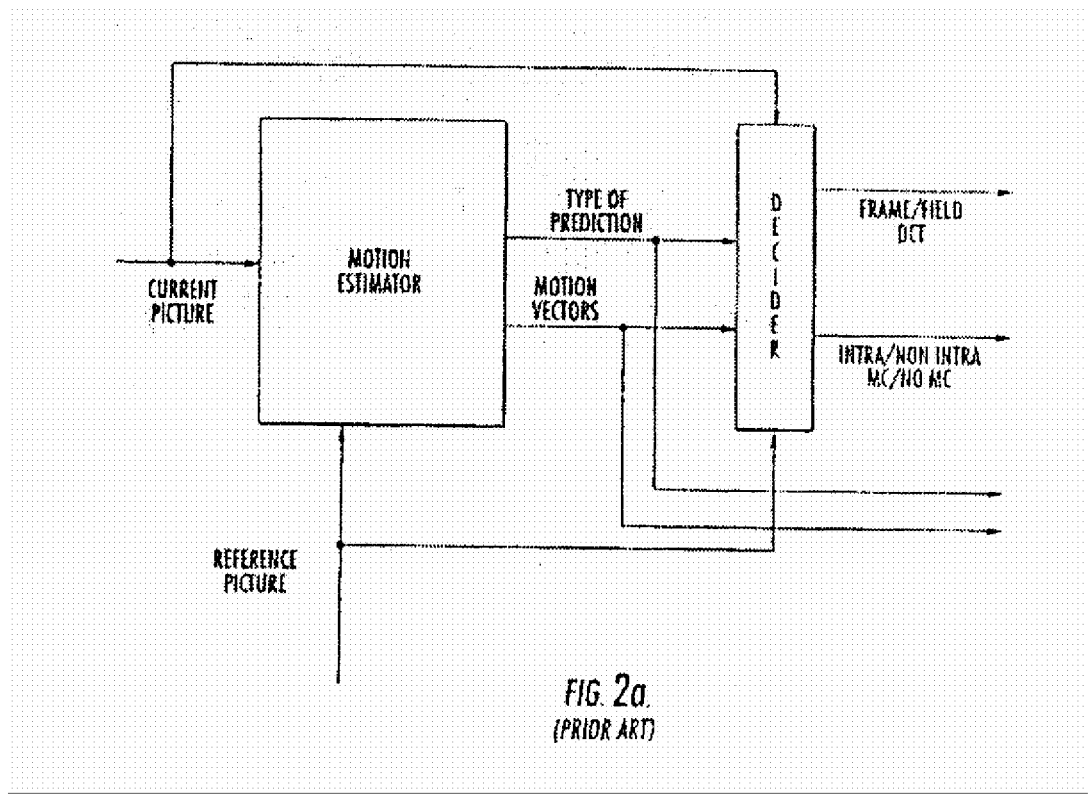
Figure 2B:
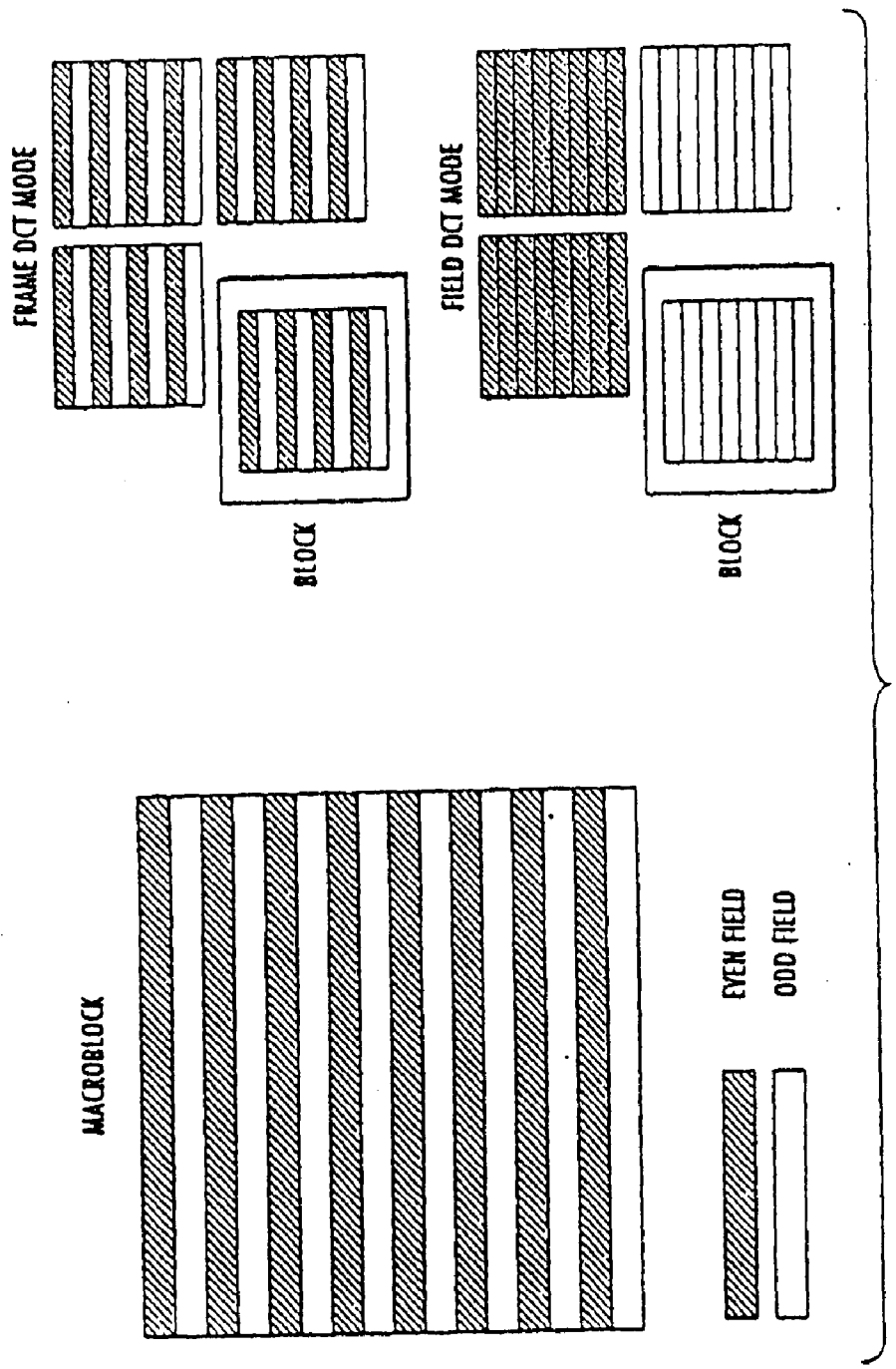
Figure 2C:
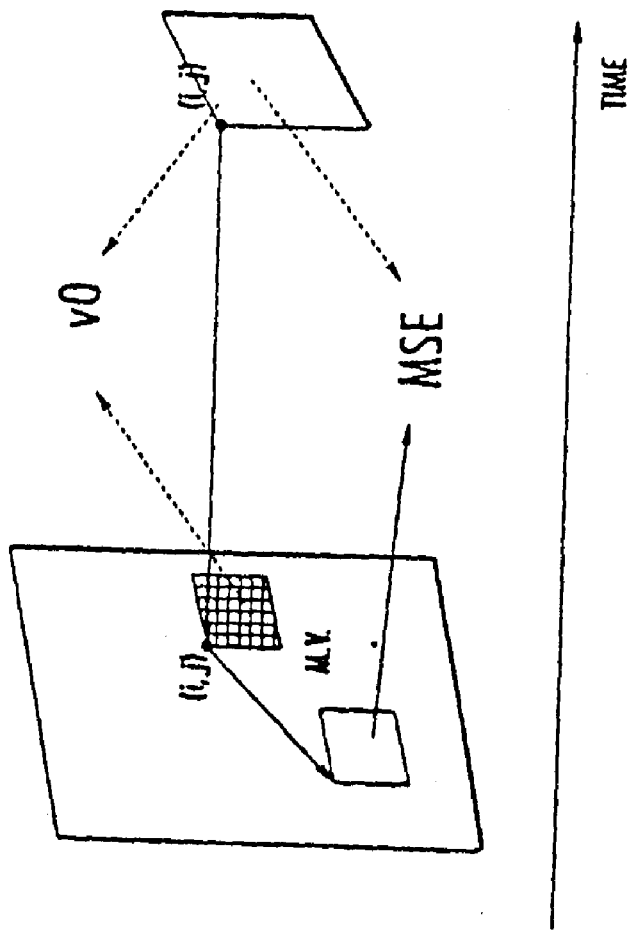

DCT Field of Frame. In referring to the scheme of FIG. 5, a complexity index of the single blocks that compose the current macroblock is calculated for both field and frame modality. The term block complexity is the maximum of all the absolute differences between two horizontally adjacent pixels belonging to the same line and vertically adjacent pixels. By adding the maxima of the differences calculated for all the blocks composing a certain macroblock, a total macroblock complexity is obtained.

The calculation is repeated twice. Once on the blocks obtained as though the successive DCT transform would be done in a frame mode, therefore with the lines of the blocks belonging to different semifields. A second calculation is done by supposing that the DCT transform would be done in a field mode, and, therefore, with the lines of the blocks belonging to the same semifields. Once the two computed complexity values are obtained, the lowest is selected and the DCT transform is actually performed according to such a selection.

This procedure is identical for the case in which the current macroblock is either Intra or non-Intra, though the complexity calculation will be carried out on the original macroblock in the first case, and on the error macroblock in the second case. The method of the invention is particularly useful in applications such as coders for DVD recording, camcorders and the like.

That which is claimed is:

1. A method for coding video data according to a standard wherein non-Intra fields are identified among Intra fields and various coding options exist for the non-Intra fields including removal of temporal redundancy using a motion estimation algorithm and identification of predictor macroblocks providing approximation according to a prediction mode selectable among respective predicting modes of the different types of non-Intra fields, the method comprising the steps of:

a) calculating a discrete cosine transform (DCT) for blocks of data of the predictor macroblocks according to a frame mode of decomposition with the blocks being composed of lines of data belonging to even lines semifield and to odd lines semifield, or in a field mode of decomposition with the blocks being composed of lines of data belonging to the same semifield;

b) quantizing and coding the data resulting from the DCT carried out by blocks of data to be stored;

c) computing for pixels of a current macroblock an absolute mean spread with respect to an average value ($SMA_p$) and calculating an absolute mean spread ($SMA_\varepsilon$) of a prediction error of each pixel of the current macroblock with respect to a common pixel of the predictor macroblock;

d) selecting a coding option for the data of the current macroblock depending on the following conditions:

$$\begin{cases} SMA_\varepsilon > SMA_p \\ SMA_\varepsilon \geq Threshold1 \end{cases}$$

e) if at least one of the above two conditions in step d) are not satisfied, then determining whether the macroblock belongs to a field whose temporal redundancy with respect to a preceding field and/or successive field has been removed;

f) if temporal redundancy has been removed, then inserting a relative predictor in a data stream together with motion vectors that characterizes the relative predictor according to a predicting mode chosen among a forward mode, a backwards mode, an interpolated mode, and a quantized prediction error;

g) if temporal redundancy was not removed and the macroblock is recognized as belonging to a field containing temporal redundancy, then testing if the following conditions are met:

$$\begin{cases} SMA_{\varepsilon 0} > SMA_\varepsilon \\ SMA_{\varepsilon 0} \geq Threshold2 \end{cases}$$

where $SMA_{\varepsilon 0}$ is the absolute mean spread of the prediction error by using as a predictor of the current macroblock the macroblock identified by a null motion vector;

h) if both the above conditions step g) are met, then motion compensation is carried out by inserting the relative predictor in the data stream together with the motion vectors that characterize the relative predictor according to a predicting mode chosen between a forward mode or a dual prime mode and a quantized prediction error;

i) if the above conditions in step g) are not met, then motion compensation is not effected by inserting the prediction error when using as a predictor of the current macroblock the macroblock identified by the null motion vector in the data stream together with a null motion vector;

j) calculating a complexity index of the single blocks of decomposition of the current macroblock according to a field mode and to a frame mode of the Intra type or of the error macroblock if the current macroblock is the non-Intra type, as a maximum value of a maximum absolute difference between any two adjacent pixels on a same line and on a same column of the block, and summing the maximum absolute differences of all the blocks defining a total complexity index of the relative macroblock; and k) identifying a minimum value of the complexity index for the same macroblock calculated in a frame mode and in a field mode, and calculating the DCT in the decomposition mode for which the minimum value of complexity index has been identified.

2. A method according to claim 1, wherein the steps are implemented in accordance with the MPEG-2 standard.

3. A method for coding video data according to a standard wherein non-Intra fields are identified among Intra fields and various coding options exist for the non-Intra fields including removal of temporal redundancy using a motion estimation algorithm and identification of predictor macroblocks providing approximation according to a prediction mode selectable among respective predicting modes of the different types of non-Intra fields, the method comprising the steps of:

a) calculating a discrete cosine transform (DCT) for blocks of data of the predictor macroblocks according to a frame mode of decomposition with the blocks being composed of lines of data belonging to even lines semifield and to odd lines semifield, or in a field mode of decomposition with the blocks being composed of lines of data belonging to the same semifield;

b) quantizing and coding the data resulting from the DCT carried out by blocks of data to be stored; and c) computing for pixels of a current macroblock an absolute mean spread with respect to an average value ($SMA_p$) and calculating an absolute mean spread ($SMA_\varepsilon$) of a prediction error of each pixel of the current macroblock with respect to a common pixel of the predictor macroblock.

4. A method according to claim 3, further comprising the step of d) selecting a coding option for the data of the current macroblock depending on the following conditions:

$$\begin{cases} SMA_\varepsilon > SMA_p \\ SMA_\varepsilon \geq Threshold1. \end{cases}$$

5. A method according to claim 4, further comprising the step of e) if at least one of the above two conditions in step d) are not satisfied, then determining whether the macroblock belongs to a field whose temporal redundancy with respect to a preceding field and/or successive field has been removed.

6. A method according to claim 5, further comprising the steps of:

f) if temporal redundancy has been removed, then inserting a relative predictor in a data stream together with motion vectors that characterizes the relative predictor according to a predicting mode chosen among a forward mode, a backwards mode, an interpolated mode, and a quantized prediction error; and g) if temporal redundancy was not removed and the macroblock is recognized as belonging to a field containing temporal redundancy, then testing if the following conditions are met:

$$\begin{cases} SMA_{\varepsilon 0} > SMA_\varepsilon \\ SMA_{\varepsilon 0} \geq Threshold2 \end{cases}$$

where $SMA_{\varepsilon 0}$ is the absolute mean spread of the prediction error by using as a predictor of the current macroblock the macroblock identified by a null motion vector.

7. A method according to claim 6, further comprising the steps of:
   h) if both the above conditions step g) are met, then motion compensation is carried out by inserting the relative predictor in the data stream together with the motion vectors that characterize the relative predictor according to a predicting mode chosen between a forward mode or a dual prime mode and a quantized prediction error; and
   i) if the above conditions in step g) are not met, then motion compensation is not effected by inserting the prediction error when using as a predictor of the current macroblock the macroblock identified by the null motion vector in the data stream together with a null motion vector.

8. A method according to claim 7, further comprising the step of j) calculating a complexity index of the single blocks of decomposition of the current macroblock according to a field mode and to a frame mode of the Intra type or of the error macroblock if the current macroblock is the non-Intra type, as a maximum value of a maximum absolute difference between any two adjacent pixels on a same line and on a same column of the block, and summing the maximum absolute differences of all the blocks defining a total complexity index of the relative macroblock.

9. A method according to claim 8, further comprising the step of k) identifying a minimum value of the complexity index for the same macroblock calculated in a frame mode and in a field mode, and calculating the DCT in the decomposition mode for which the minimum value of complexity index has been identified.

10. A method according to claim 3, wherein the steps are implemented in accordance with the MPEG-2 standard.

11. A system for compressing and coding video data comprising:

a motion estimation circuit for removing temporal redundancy from non-Intra fields comprising a first stage of motion estimation, and a second stage connected to said first stage for deciding whether to apply motion compensation and for selecting a decomposition mode of a macroblock of pixels of a field in blocks for carrying out a discrete cosine transform (DCT), said second stage comprising
   a first computing circuit circulating an absolute mean spread of a prediction error of each pixel belonging to a reference macroblock as compared to common pixels of a predicting macroblock, and
   a second computing circuit circulating a vertical and horizontal complexity index comprising
      an input buffer storing the pixels of the error macroblock composed of the differences among the pixels of a current macroblock and the pixels of the reference macroblock,
      a pair of comparison circuits operating in parallel for identifying a maximum difference between any two adjacent pixels, respectively, on a same column and on a same line of the prediction error macroblock if the current macroblock belongs to a non-Intra field, or of the current macroblock if it belongs to an Intra field,
      a comparator connected to said pair of comparison circuits for outputting a highest of two maximum differences among adjacent pixels relative to a horizontal complexity and to a vertical complexity of the macroblock, and
      a processing circuit connected to said comparator for outputting a total complexity index of the macroblock as a sum of the data output by said comparator.

12. A system according to claim 11, wherein each comparison circuit of said pair of comparison circuits comprises an input multiplexer and a comparator connected to said input multiplexer.

13. A system according to claim 11, wherein said motion estimation circuit is compatible with the MPEG-2 standard.

* * * * *

UNITED STATES PATENT AND TRADEMARK OFFICE
CERTIFICATE OF CORRECTION

PATENT NO.     : 6,556,718 B1
DATED          : April 29, 2003
INVENTOR(S)    : Emiliano Piccinelli et al.

It is certified that error appears in the above-identified patent and that said Letters Patent is hereby corrected as shown below:

The title page should be deleted and substitute therefore the attached title page.

Figure 1:
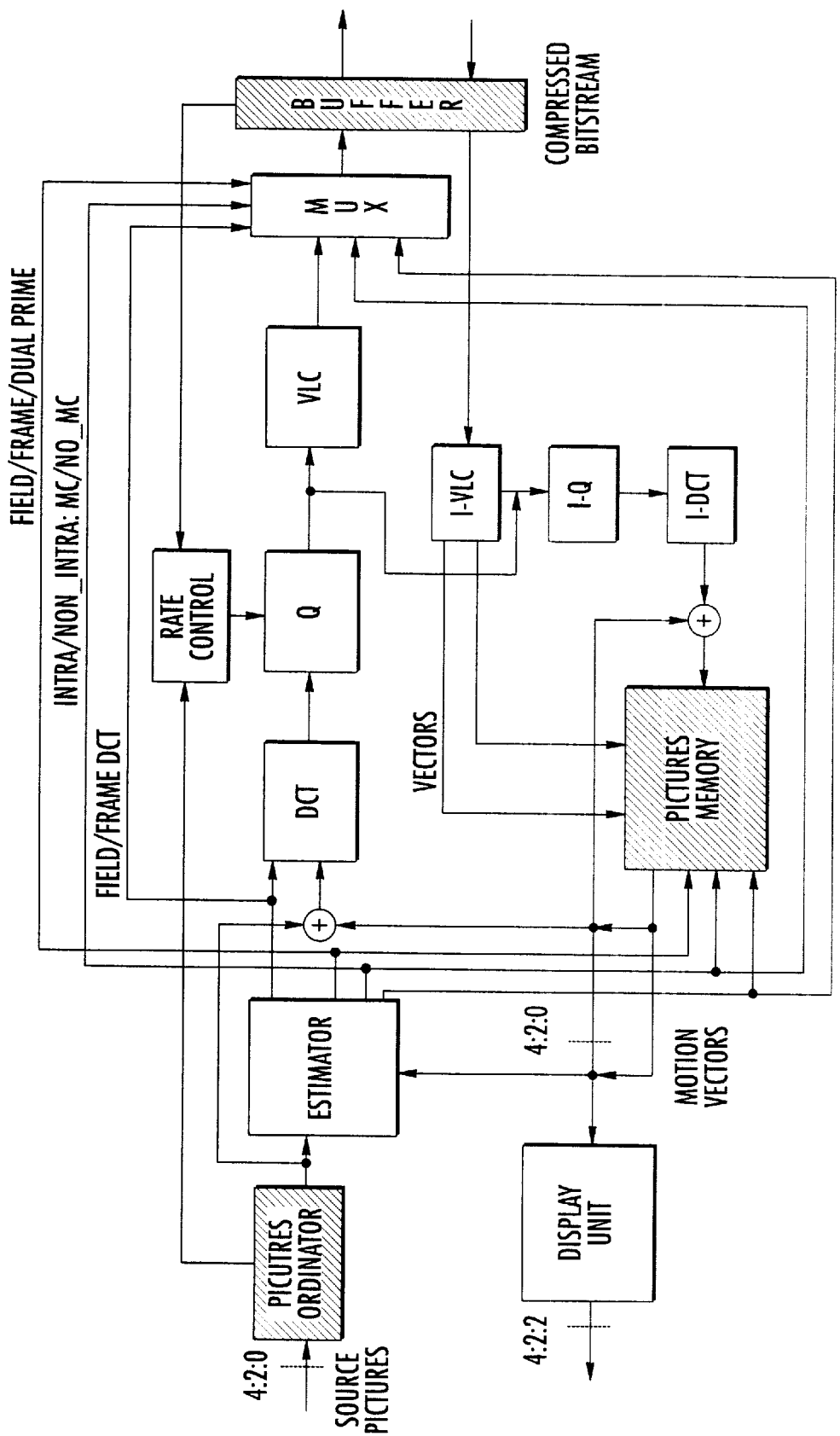
FIG. 1 is a top level schematic diagram of an MPEG-2 coder including an Estimator functional block in accordance with the prior art.
Figure 2A:
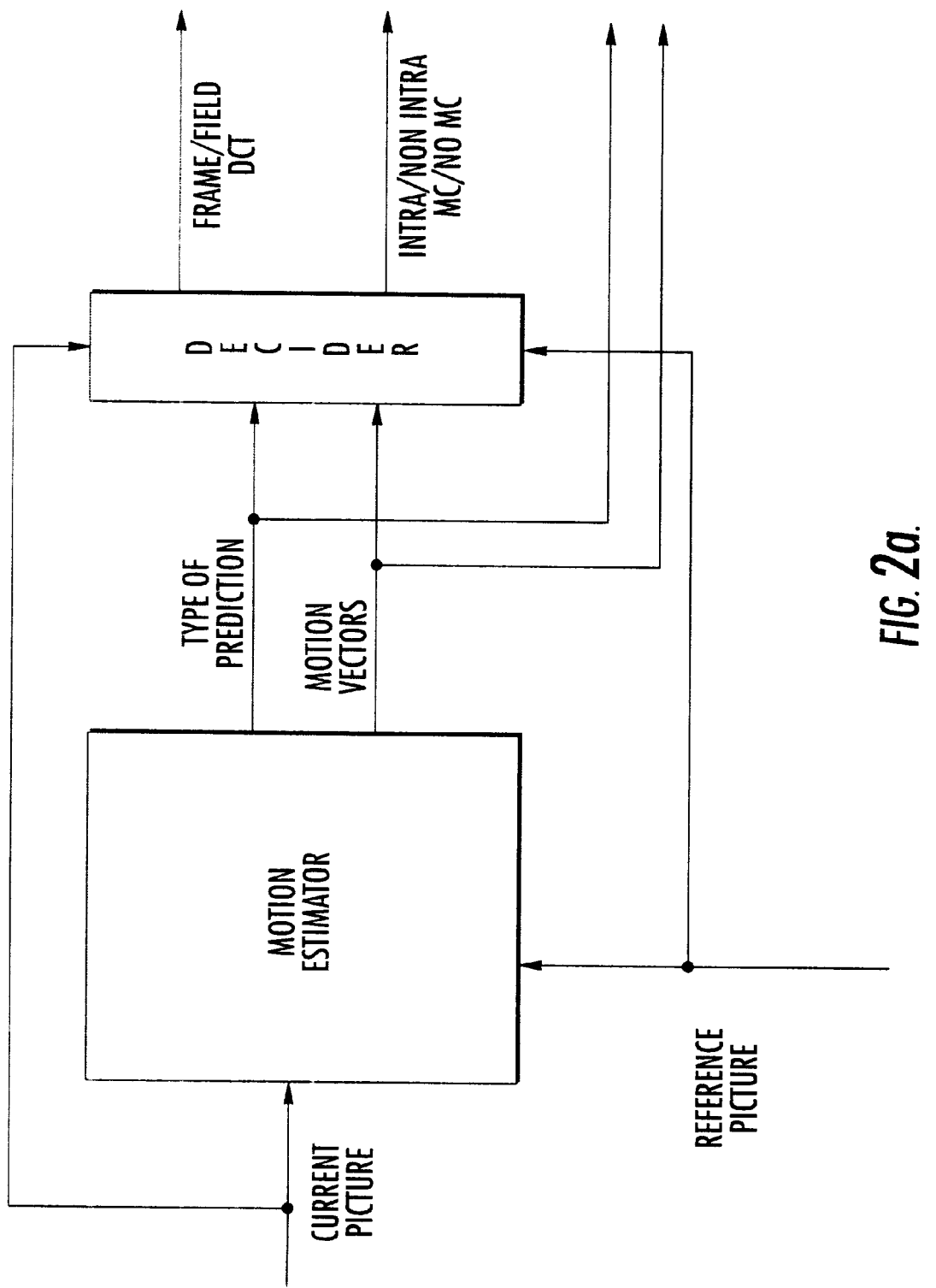
FIG. 2a is a schematic diagram of the estimator functional block of FIG. 1 including the Decider sub-block.
Figure 2B:
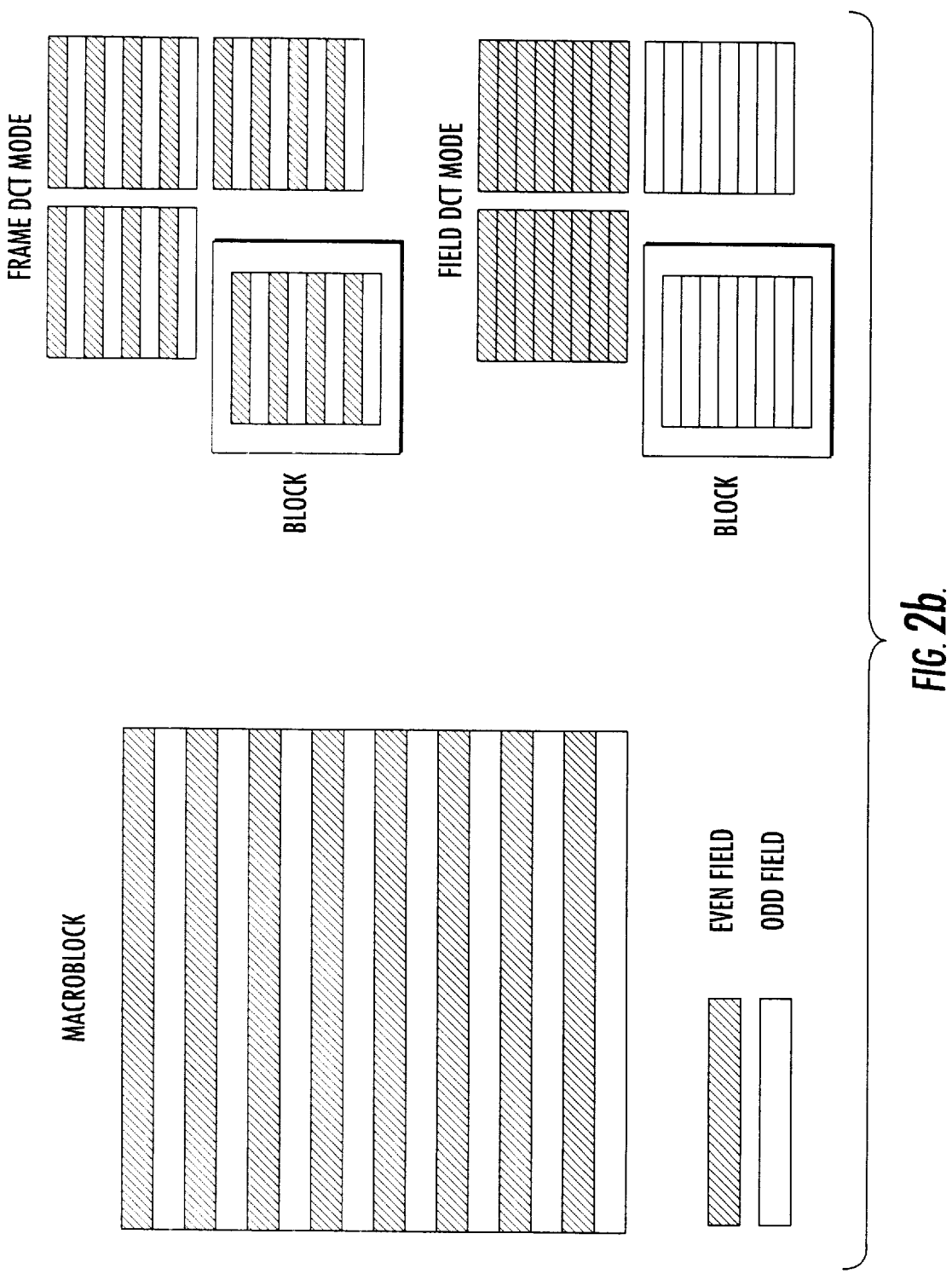
FIG. 2b shows two alternative schemes, frame and field, for decomposition of a macroblock into blocks in accordance with the prior art.
Figure 2C:
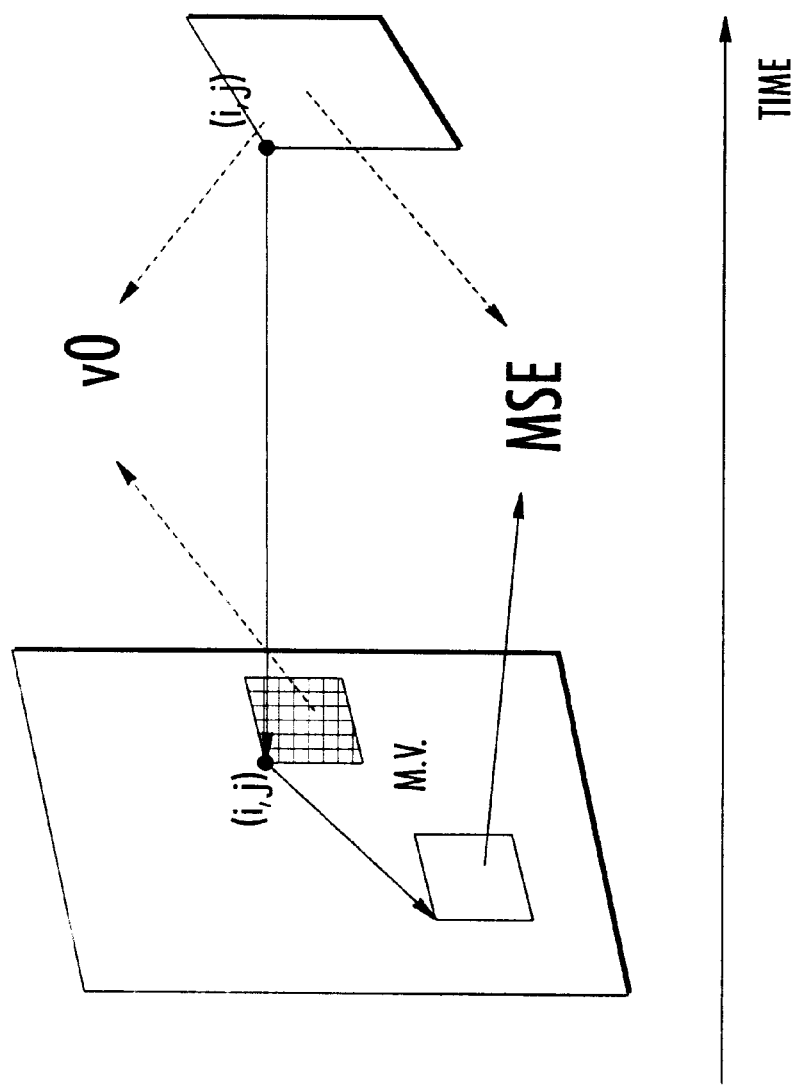
FIG. 2c shows a correlation scheme used by the algorithm in accordance with the prior art.

Drawings,
Delete drawing sheets 1-2, and substitute therefore the drawing sheets, consisting of Figs. 1-2, as shown on the attached pages.

Signed and Sealed this

Twenty-fifth Day of November, 2003

JAMES E. ROGAN
*Director of the United States Patent and Trademark Office*

United States Patent
Piccinelli et al.

(10) Patent No.: US 6,556,718 B1
(45) Date of Patent: Apr. 29, 2003

(54) VIDEO PICTURES COMPRESSION AND CODING WITH DECISION STEP FOR FIELD/FRAME AND MOTION VECTORS DCT

(75) Inventors: Emiliano Piccinelli, Monza (IT); Luca Pezzoni, Cormano (IT); Danilo Pau, Sesto San Giovanni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/438,853

(22) Filed: Nov. 12, 1999

(30) Foreign Application Priority Data

Nov. 17, 1998 (EP) .............................. 98830689

(51) Int. Cl.[7] .............................. G06K 9/36; G06K 9/46
(52) U.S. Cl. .............................. 382/236; 375/240.13
(58) Field of Search .............................. 382/232, 236, 382/238, 239, 250; 375/240.02, 240.12, 240.13, 240.16, 240.2, 240.24; 348/394.1, 395.1, 403.1, 404.1, 407.1, 409.1, 415.1, 416.1, 420.1

(56) References Cited

U.S. PATENT DOCUMENTS 5,666,461 A    9/1997  Igarashi et al. .............. 386/95
5,883,672 A *  3/1999  Suzuki et al. ........... 375/240.04
5,978,029 A * 11/1999  Boice et al. ............ 375/240.14

FOREIGN PATENT DOCUMENTS

EP           0 695 097 A2    1/1996    .......... H04N/7/50

* cited by examiner

Primary Examiner—Timothy M. Johnson
(74) Attorney, Agent, or Firm—Allen, Dyer, Doppelt, Milbrath & Gilchrist, P.A.; Lisa K. Jorgenson

(57) ABSTRACT

A method for coding video data according to the MPEG-2 standard is provided. Non-Intra fields are identified among Intra fields and various coding options exist for the non-Intra fields, including removal of temporal redundancy using a motion estimation algorithm and identification of predictor macroblocks for providing approximation according to a prediction mode selectable among respective predicting modes of the different types of non-Intra fields. The method includes calculating a discrete cosine transform (DCT) for blocks of data of the predictor macroblocks according to a frame mode of decomposition with the blocks being composed of lines of data belonging to even lines semifield and to odd lines semifield, or in a field mode of decomposition with the blocks being composed of lines of data belonging to the same semifield. The data resulting from the DCT carried out by blocks of data to be stored is quantized and coded. The efficiency of the method for coding video data according to the MPEG-2-standard is increased by selecting between field or frame modes and motion compensation or no motion compensation with an algorithm that assesses and compares significant complexity indexes of the macroblocks.

13 Claims, 9 Drawing Sheets

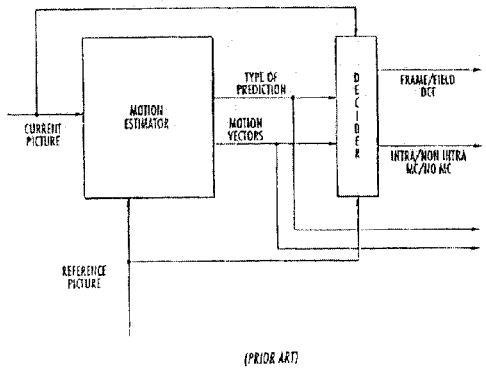

(PRIOR ART)

UNITED STATES PATENT AND TRADEMARK OFFICE
CERTIFICATE OF CORRECTION

PATENT NO.  : 6,556,718 B1
DATED       : April 29, 2003
INVENTOR(S) : Emiliano Piccinelli et al.

It is certified that error appears in the above-identified patent and that said Letters Patent is hereby corrected as shown below:

The title page should be deleted and substitute therefore the attached title page.

Drawings,
Delete drawing sheets 1-2, and substitute therefore the drawing sheets, consisting of Figs. 1-2, as shown on the attached pages.

Column 3,
Line 44, delete "Interpolated" insert -- Interpolated. --

Column 5,
Line 8, delete $$\rho = \left[\sum_{j=0}^{7}\sum_{i=0}^{15}(\varepsilon_{Top}[i,j]\cdot\varepsilon_{Bot}[i,j]) - \left(\sum_{i=0}^{15}\sum_{i=0}^{15}\varepsilon_{Top}[i,j]\cdot\sum_{j=0}^{15}\sum_{i=0}^{15}\varepsilon_{Bot}[i,j]\right)\Big/128\right]\Big/\sqrt{d}$$

insert $$\rho = \left[\sum_{j=0}^{15}\sum_{i=0}^{15}\left(\varepsilon_{Top}[i,j]\cdot\varepsilon_{Bot}[i,j]\right) - \left(\sum_{i=0}^{15}\sum_{i=0}^{15}\varepsilon_{Top}[i,j]\cdot\sum_{j=0}^{15}\sum_{i=0}^{15}\varepsilon_{Bot}[i,j]\right)\Big/128\right]\Big/\sqrt{d}$$

This certificate supersedes Certificate of Correction issued November 25, 2003.

Signed and Sealed this

Second Day of March, 2004

JON W. DUDAS
*Acting Director of the United States Patent and Trademark Office*

(12) United States Patent
Piccinelli et al.

(10) Patent No.: US 6,556,718 B1
(45) Date of Patent: Apr. 29, 2003

(54) VIDEO PICTURES COMPRESSION AND CODING WITH DECISION STEP FOR FIELD/FRAME AND MOTION VECTORS DCT

(75) Inventors: Emiliano Piccinelli, Monza (IT); Luca Pezzoni, Cormano (IT); Danilo Pau, Sesto San Giovanni (IT)

(73) Assignee: STMicroelectronics S.r.l., Agrate Brianza (IT)

(*) Notice: Subject to any disclaimer, the term of this patent is extended or adjusted under 35 U.S.C. 154(b) by 0 days.

(21) Appl. No.: 09/438,853

(22) Filed: Nov. 12, 1999

(30) Foreign Application Priority Data

Nov. 17, 1998 (EP) ............................................ 98830689

(51) Int. Cl.[7] .............................. G06K 9/36; G06K 9/46
(52) U.S. Cl. .................................. 382/236; 375/240.13
(58) Field of Search ................................ 382/232, 236, 382/238, 239, 250; 375/240.02, 240.12, 240.13, 240.16, 240.2, 240.24; 348/394.1, 395.1, 403.1, 404.1, 407.1, 409.1, 415.1, 416.1, 420.1

(56) References Cited

U.S. PATENT DOCUMENTS 5,666,461 A   9/1997  Igarashi et al. ................ 386/95
5,883,672 A * 3/1999  Suzuki et al. ........... 375/240.04
5,978,029 A * 11/1999 Boice et al. ............ 375/240.14

FOREIGN PATENT DOCUMENTS

EP        0 695 097 A2    1/1996   ............ H04N/7/50

* cited by examiner

Primary Examiner—Timothy M. Johnson
(74) Attorney, Agent, or Firm—Allen, Dyer, Doppelt, Milbrath & Gilchrist, P.A.; Lisa K. Jorgenson

(57) ABSTRACT

A method for coding video data according to the MPEG-2 standard is provided. Non-Intra fields are identified among Intra fields and various coding options exist for the non-Intra fields, including removal of temporal redundancy using a motion estimation algorithm and identification of predictor macroblocks for providing approximation according to a prediction mode selectable among respective predicting modes of the different types of non-Intra fields. The method includes calculating a discrete cosine transform (DCT) for blocks of data of the predictor macroblocks according to a frame mode of decomposition with the blocks being composed of lines of data belonging to even lines semifield and to odd lines semifield, or in a field mode of decomposition with the blocks being composed of lines of data belonging to the same semifield. The data resulting from the DCT carried out by blocks of data to be stored is quantized and coded. The efficiency of the method for coding video data according to the MPEG-2-standard is increased by selecting between field or frame modes and motion compensation or no motion compensation with an algorithm that assesses and compares significant complexity indexes of the macroblocks.

13 Claims, 9 Drawing Sheets

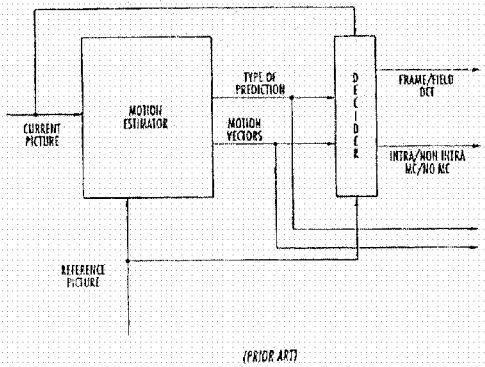

(PRIOR ART)